US008300703B2

(12) United States Patent
Chengalvala et al.

(10) Patent No.: US 8,300,703 B2
(45) Date of Patent: Oct. 30, 2012

(54) SYSTEM AND METHOD FOR ADAPTIVELY ALLOCATING RESOURCES IN A TRANSCODER

(75) Inventors: Vivekanand Chengalvala, Montgomery Village, MD (US); Djordje Senicic, Belgrade (YU)

(73) Assignee: Texas Instruments Incorporated, Dallas, TX (US)

( * ) Notice: Subject to any disclaimer, the term of this patent is extended or adjusted under 35 U.S.C. 154(b) by 504 days.

(21) Appl. No.: 12/564,532

(22) Filed: Sep. 22, 2009

(65) Prior Publication Data

US 2011/0069750 A1    Mar. 24, 2011

(51) Int. Cl.
*H04N 7/12* (2006.01)

(52) U.S. Cl. .............................. 375/240.25; 375/240.02

(58) Field of Classification Search .................. 375/240, 375/240.01, 240.02, 240.25
See application file for complete search history.

(56) References Cited

U.S. PATENT DOCUMENTS

| 5,706,478 | A | | 1/1998 | Dye |
| 5,778,250 | A | | 7/1998 | Dye |
| 5,977,983 | A | | 11/1999 | Einkauf et al. |
| 6,141,447 | A | * | 10/2000 | Linzer et al. ................ 382/236 |
| 7,170,938 | B1 | * | 1/2007 | Cote et al. ................ 375/240.03 |
| 2003/0099293 | A1 | * | 5/2003 | Okada et al. ............. 375/240.13 |
| 2007/0092004 | A1 | * | 4/2007 | Ho ............................ 375/240.12 |
| 2007/0294738 | A1 | * | 12/2007 | Kuo et al. ..................... 725/116 |
| 2008/0088637 | A1 | * | 4/2008 | Owen et al. .................. 345/535 |
| 2010/0111161 | A1 | * | 5/2010 | Ramachandran ........ 375/240.01 |
| 2010/0128800 | A1 | * | 5/2010 | He et al. ................... 375/240.25 |
| 2010/0290528 | A1 | * | 11/2010 | Chengalvala et al. ... 375/240.16 |

FOREIGN PATENT DOCUMENTS

| WO | WO 03/094451 A1 | 11/2003 |
| WO | WO 2008/027842 A2 | 3/2008 |

* cited by examiner

*Primary Examiner* — Kwang B Yao
*Assistant Examiner* — Nguyen Ngo
(74) *Attorney, Agent, or Firm* — Steven A. Shaw; W. James Brady; Frederick J. Telecky, Jr.

(57) ABSTRACT

An adaptive transcoder is provided that includes a shared memory containing a plurality of decoder buffers to store incoming data packets, a plurality of decoder instances to control a decoding process to generate image raw data based on the incoming data packets, and a plurality of encoder instances configured to control an encoding process to generate outgoing packets based on the image raw data; and a data processing element containing a plurality of processing cores, and a core controller. Each decoder instance is paired with an encoder instance; and each decoder buffer is associated with a decoder instance. Each decoder buffer includes a monitoring element to monitor a respective decoder buffer, and provide buffer data corresponding to the status of the decoder buffer. Each encoder instance is associated with a processing core; and the core controller uses the buffer data to associate each decoder instance with a processing core.

11 Claims, 6 Drawing Sheets

FIG. 1

SYSTEM AND METHOD FOR ADAPTIVELY ALLOCATING RESOURCES IN A TRANSCODER

TECHNICAL FIELD

The technical field relates in general to communications, and, more specifically, the system and method for allocating processing resources in a media gateway that deals with video transcoding (i.e., a video media gateway).

BACKGROUND

It is often necessary in a video communication system to translate signals between various formats. For example, it may be necessary to translate a signal encoded in H.264 into a signal encoded in MPEG-4. In order to accomplish this, a transcoding gateways application (i.e., a transcoder) can be provided.

A media gateway often contains multiple channels, each of which can translate a video stream from one format to another. Typically the gateway receives video streams over IP networks, transcodes the content and sends the transcoded media on IP network. These channels each buffer incoming packets, decode the packets from one format, and then re-encode them into a second format for transmission. However, due to the bursty nature of signal traffic it can be difficult to allocate resources in the media gateway efficiently among the channels.

Encoding is typically more resource-intensive then decoding. In practical terms that means that an encoder takes a greater amount of MIPS (i.e., million instructions per second) as compared to a decoder. As a result, when incoming packets are buffered in a transcoding channel, the encoder typically governs the drain rate of the buffer on the decoder leg.

When consecutive frames are consuming a higher than average/median MIPS budget, the input buffer will begin to fill faster than it drains. If it reaches its maximum level, then frames will have to be dropped for decoding. This can cause problems with decoding, since video decoding is often heavily reliant upon information from adjacent packets. Thus, when packets are dropped, decoding quality can drop dramatically.

One way to ensure adequate decoding resources for each channel would be to provide processing for each channel sufficient to meet a worst-case scenario (i.e., a worst-case MIPS load for the channel). However, using such a system can be very wasteful, since in a worst-case each channel can demand a great deal of resources. Because this would require each channel to be allocated resources based on a worst-case, during most normal operation such channels would have a large amount of unused processing capacity going to waste.

It would therefore be desirable to provide an adaptive transcoder that can allocate its resources as needed when channels become congested. It would further be desirable to provide a transcoder that can account for situations in which all available channels are congested at the same time, and can limit image processing and encoding operations, while continuing to allow the decoding operation to use as much of the processing resources as it requires.

SUMMARY

Embodiments described herein provide a system and method for adaptively allocating resources in a media gateway kind of solution. In particular, they provide a way for offloading part of processing to a different processing core if a buffer drain rate falls too far behind the buffer fill rate. They also allow for a reduction in image processing (such as optionally turn off image denoising, sharpening etc functionality between decoder and encoder) and encoding demand by shutting off certain encoding features (and thus reduce MIPS consumption on the encoder) to increase the buffer drain rate.

Accordingly, a first disclosed embodiment described herein provides an adaptive transcoder, comprising: a shared memory containing a plurality of decoder buffers (e.g., FIFOs) configured to store a plurality of incoming data packets, a plurality of decoder instances configured to control a decoding process to generate a plurality of image raw data based on the plurality of incoming data packets, and a plurality of encoder instances configured to control an encoding process to generate a plurality of outgoing packets based on the image raw data; and a data processing element containing a plurality of processing cores and a core controller. Each of the plurality of decoder instances is paired with one of the plurality of encoder instances, and each of the decoder buffers (FIFOs) is associated with one of the decoder instances. Each respective decoder buffer (FIFO) includes a respective monitoring element for monitoring a status of each the respective decoder buffer, and providing buffer data corresponding to the status of the respective decoder buffer. Each of the plurality of the encoder instances is associated with a corresponding one of the plurality of processing cores. The core controller uses the buffer data to associate each of the plurality of decoder instances with a selected one of the plurality of processing cores.

A second disclosed embodiment described herein provides a method of adaptively controlling decoding and encoding in a transcoder, comprising: receiving incoming data packets; storing the incoming data packets in a memory element; determining an amount of the memory element currently being used to store the incoming data packets; allocating processing resources for encoding and decoding based on the amount of the memory element currently being used; performing a decoding operation on the incoming data packets to generate image raw data; and performing an encoding operation on the image raw data to generate outgoing packets.

A third disclosed embodiment described herein provides An adaptive transcoder, comprising: a shared memory containing a channel instance configured to provide instructions and memory for translating a plurality of incoming data packets from a first format to a second format; and a data processing element configured to provide the data processing for translating the plurality of incoming data packets from the first format to the second format. The channel instance includes a decoder FIFO buffer configured to store the plurality of incoming data packets, and to provide FIFO data indicating how many packets are contained in the FIFO buffer, a decoder instance configured to control a decoding process from the first format to generate a plurality of image raw data based on the plurality of incoming data packets, and an encoder instance configured to control an encoding process to generate a plurality of outgoing packets in the second format based on the image raw data. The data processing element includes a plurality of processing cores, each configured to perform the decoding process based on the decoder instance, or the encoding process based on the encoder instance, and a core controller is configured to assign of the decoder instance one of the plurality of processing cores.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

In overview, the present disclosure concerns a system and method for adaptively allocating resources in a media gateway. More specifically, it relates to a circuit and related method for using an indicator of how full a decoding packet buffer is to determine how resources should be allocated in the transcoder. The congestion in the decoding packet buffer provides a good indicator of the congestion of the associated channel and allows the controller to more accurately allocate transcoder resources, and potentially limit encoding parameters to reduce congestion on the individual channels.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

Transcoding Circuit

Figure 1:
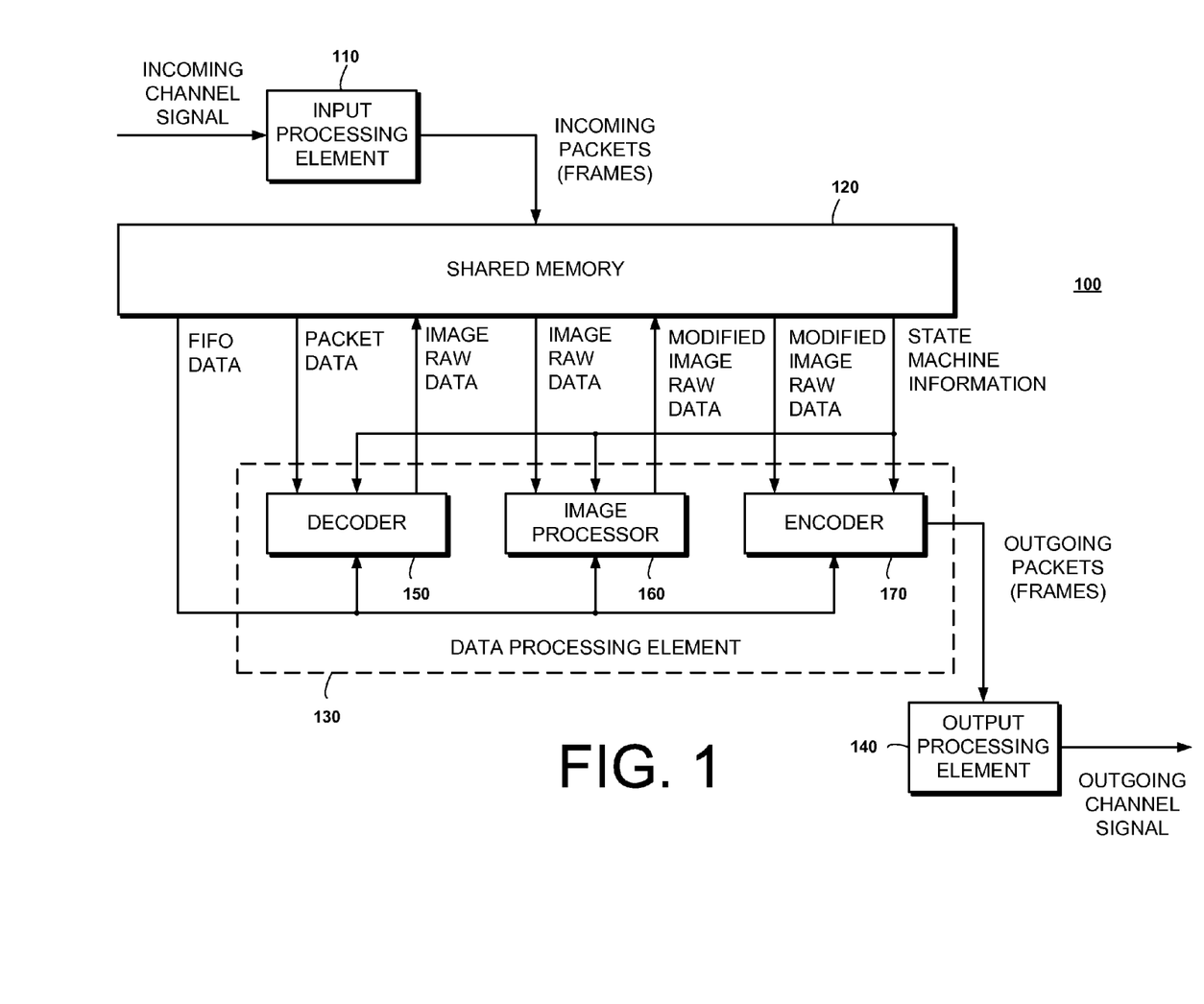
FIG. 1 is a functional block diagram of a transcoder according to disclosed embodiments.

A multiple-channel transcoding circuit is provided that receives incoming packets (i.e., frames) and translates them from one format into another. FIG. 1 is a functional block diagram of a transcoder 100 according to disclosed embodiments. As shown in FIG. 1, the transcoder 100 includes an input processing element 110, a shared memory 120, a data processing element 130, and an output processing element 140 element. The data processing element 130 further includes a decoder 150, an image processor 160, and an encoder 170.

The input processing element 110 receives an incoming channel signal, and performs one or more processing operations on the incoming signal to extract incoming packets (i.e., frames). These processing operations can include packet extraction, application, filtering, and the like.

The shared memory 120 receives the incoming packets from the input processing element, stores them, and serves as a memory element for operations performed by the data processing element 130. It can be any kind of suitable dynamic memory, e.g., RAM, flash memory, and the like.

The shared memory 120 includes a plurality of FIFO buffers, one for each channel. It monitors the status of these FIFO buffers and provides FIFO data to the data processing element 130 regarding the status of these FIFO buffers. In particular, the FIFO data can include information regarding how full each of the FIFO buffers is (i.e., how many packets each FIFO buffer contains or how close each FIFO buffer is being completely full).

The data processing element 130 performs the actual decoding, image processing, and encoding operations of the transcoding circuit. Functionally, it includes the decoder 150, the image processor 160, and the encoder 170. However, its actual implementation may vary. In some embodiments it may include separate dedicated devices for decoding, image processing, and encoding. In other embodiments it can include multiple processing devices (e.g., central processing units or processing cores) that can perform one or more of the required decoding, image processing, or encoding operations. In such an embodiment of processing devices can be assigned as needed to perform these various operations.

The data processing element 130 operates based on state machine information contained in the shared memory 120, based on the FIFO data, and based on image data (e.g., the incoming packets) stored in the shared memory 120. It may have some internal memory, but also reads and writes raw image data to and from the shared memory. In this way different portions of the data processing element 130 may operate on the same data along a transcoding path.

The decoder 150 performs a decoding operation on an incoming packet based on state machine information and FIFO data received from the shared memory 120 to transform incoming packets from a first format into image raw data suitable for image processing and encoding. The decoder 150 reads the packet data from the shared memory 120, and stores the decoded image raw data to the shared memory 120.

The image processor 160 performs one or more image processing operations on the image raw data based on state machine information and FIFO data received from the shared memory 120 to generate modified image raw data. These can include de-blocking, quarter PEL interpolation, 8×8 MV, Intra 4×4 and the like. The image processor 160 reads the image raw data from the shared memory 120 and stores the modified image raw data to the shared memory 120.

The encoder 170 performs an encoding operation on the modified image raw data based on state machine information and FIFO data received from the shared memory 120 to generate outgoing packets (i.e., frames) in a second format. The encoder 160 reads the modified image raw data from the shared memory 120 and provides the outgoing packets to be output processing element 140.

The output processing element 140 receives the outgoing packets from the encoder 170 in the data processing element 130, performs one or more signal processing operations, and provides the outgoing packets as an outgoing channel signal. These signal processing operations can include back and processing, filtering, application, aggregation, etc.

Figure 2:
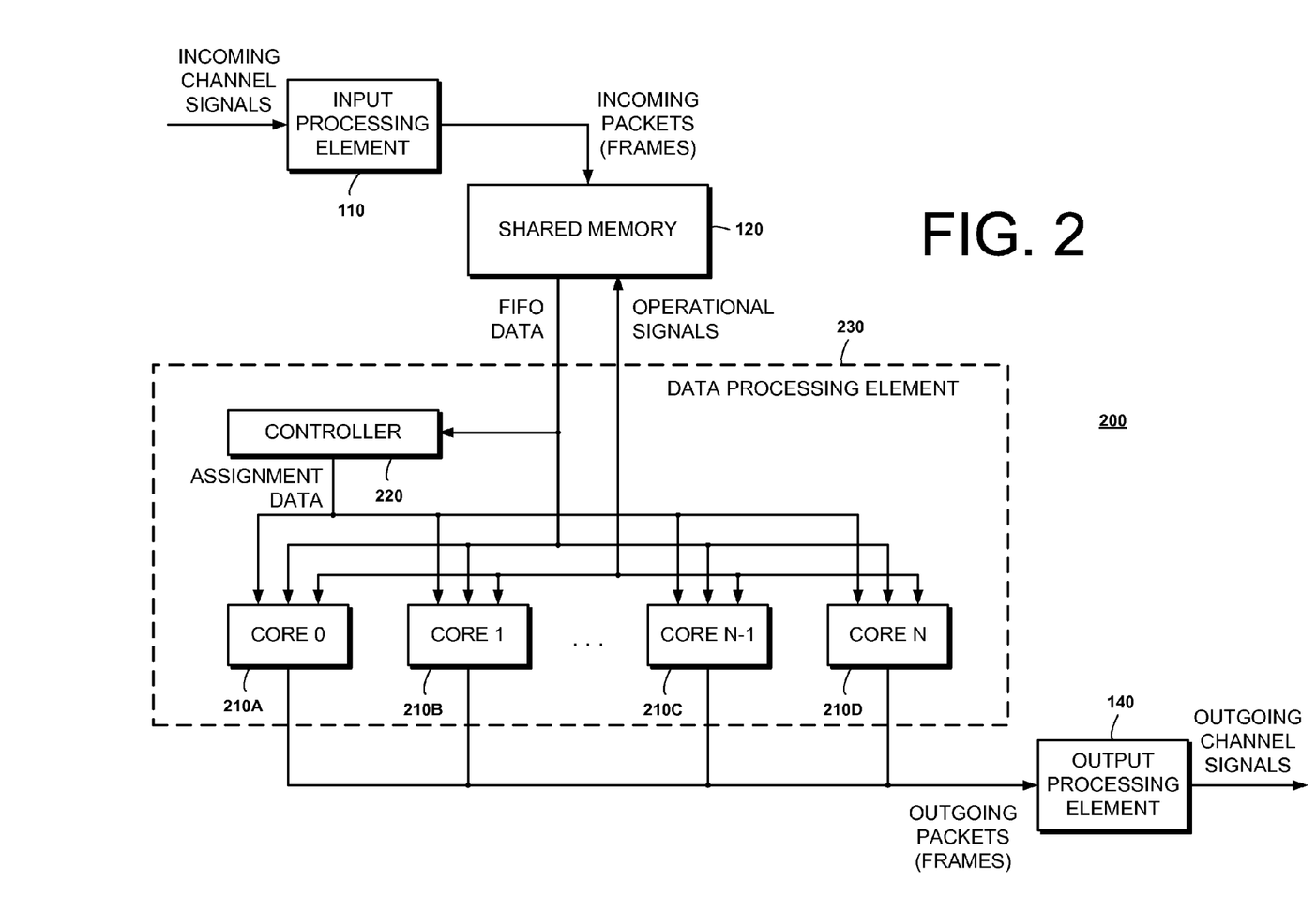
FIG. 2 is an alternate block diagram of the transcoder according to disclosed embodiments.

FIG. 2 is an alternate block diagram of the transcoder 200 according to disclosed embodiments. FIG. 2 is similar to FIG. 1, but shows a particular implementation of the data processing element 230.

As shown in FIG. 2, the transcoder 200 includes an input processing element 110, a shared memory 120, a data processing element 230, and an output processing element 140. The data processing element 130 further includes a plurality of cores 210A, 210B, 210C, ..., 210D (generally referred to as cores 210), and a controller 220. Elements in FIG. 2 that are the same as those in FIG. 1 will not be described. Only elements that are different in FIG. 2 will be described.

The shared memory 120 generates FIFO data and sends and receives operational signals. The FIFO data is as described with respect to FIG. 1, and the operational signals can include the packet data the image raw data, the modified image raw data, and the state machine information.

The cores 210 are processing elements (e.g., central processing units, microprocessors, or the like.) that are capable of performing the decoding, image processing, and encoding operations. They each receive the FIFO data and appropriate operational signals from the shared memory 120, and are capable of storing operational signals into the shared memory. For example when a core 210 operates as a decoder it receives the FIFO data, the packet data, and the state machine information relating to decoding from the shared memory 120, and stores the image raw data to the shared memory 120. Each of the cores 210 also receives assignment data from the controller 220, which identifies the core that will perform each operation.

In the disclosed embodiments, image processing and encoding operations are performed by the same core 210. However, this is merely by way of example. In alternate embodiments image processing could be associated with the core 210 that performs decoding, or it could be separately assigned, independent which core 210 performs decoding which core 210 performs encoding.

The controller 220 uses the FIFO data to generate the assignment data. In the disclosed embodiments, each operation (i.e., decoding, image processing, and encoding) has a default core that it will be assigned to. For example if the number of cores 210 is equal to the number of channels each set of associated decoding, image processing, and encoding operations will be assigned to one core 210. If there are fewer cores 210 then channels, or more cores 210 then channels, then a different set of default assignments can be arranged to spread out processing among the cores 210. However, generally all of the operations for a given channel will by default be assigned to the same core. In alternate embodiments, however, a truly dynamic assignment approach can be used in which one or more operations are dynamically assigned at each instance based on channel congestion.

As noted above, at times data traffic on a particular channel will be high, requiring greater system resources for processing that channel (e.g., typically requiring more MIPS for encoding). In such a circumstance, it is desirable to either shift processing to different core 210, or limit the processing resources used by the core 210 for processing the channel. Therefore, the controller 220 also uses the FIFO data to determine when a channel has become congested and should have some of its operations assigned to a different core 210.

The controller 220 uses the FIFO data from FIFO buffers associated with each channel to determine both when processing should be shifted to a different core 210, and whether there is a core 210 with sufficient free resources to handle the reassigned processing.

Because all of the image processing data (e.g. packet data, image raw data, and modified image raw data) are stored in the shared memory 120, it is possible for the processing of a channel to be performed by different cores 210. For example, core 0 210A may be assigned to perform a decoding operation, and core 1 210B may be assigned to perform an image processing/encoding operation. But the fact that they are separate cores 210 will not interfere with their operation. The core 0 210A will read the packet data from the shared memory 120, perform its decoding operation to generate image raw data, and will store the image raw data to the shared memory 120. The core 1 210B will then read the image raw data from the shared memory 120, perform image processing on the image raw data to generate modified image raw data, and will perform an encoding operation on the modified image raw data to generate the outgoing packets.

Figure 3:
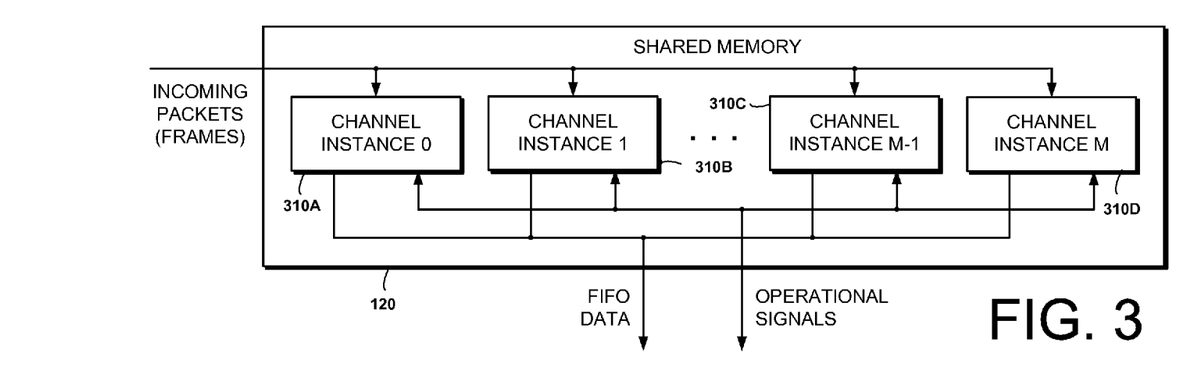
FIG. 3 is a block diagram of the shared memory of FIGS. 1 and 2 according to disclosed embodiments.

FIG. 3 is a block diagram of the shared memory 120 of FIGS. 1 and 2 according to disclosed embodiments. As shown in the FIG. 3, the shared memory 120 includes a plurality of channel instances 310A, 310B, 310C, ..., 310D (generally referred to as channel instances 310). Each of these channel instances 310 can receive incoming data packets from the processing element, and store them in an associated FIFO buffer. The channel instances 310 also contain both the state machine information and ability to store image data necessary to perform a particular transcoding operation. For example, each channel instance may provide for different translation from one format to another. Alternatively, multiple channels may be provided for particularly popular transcoding operations.

The channel instances 310 each provide operational signals and FIFO data necessary for performing associated decoding, image processing, and encoding operations, and are capable of receiving and storing operational signals from the data processing element 130.

Figure 4:
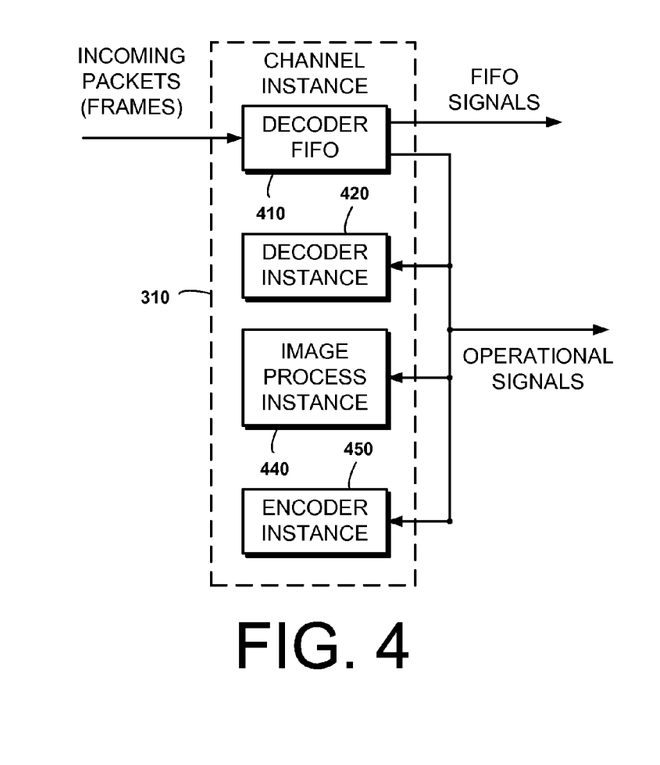
FIG. 4 is a block diagram of a channel instance of FIG. 3 according to disclosed embodiments.

FIG. 4 is a block diagram of a channel instance of FIG. 3 according to disclosed embodiments. As shown in FIG. 4, a channel instance 310 includes a decoder FIFO 410, a decoder instance 420, an image process instance 440, and an encoder instance 450.

The decoder FIFO 410 is a buffer that allows for the storage of a certain number of packets for decoding. It can output the packets as part of the operational signals, and can also output the FIFO signals indicating a status of the decoder FIFO 410.

The decoder instance 420 includes the necessary state machine information for performing the associated decoding operation, as well as either dedicated memory for storing associated image raw data, or information identifying how common memory in the shared memory 120 may be accessed to store image data.

The image process instance 440 includes the necessary state machine information for performing the associated image processing operation, as well as either dedicated memory for storing associated image raw data, or information identifying how common memory in the shared memory 120 may be accessed to store image data.

The encoder instance 450 includes the necessary state machine information for performing the associated encoding operation, as well as either dedicated memory for storing associated image raw data, or information identifying how common memory in the shared memory 120 may be accessed to store image data.

Figure 5:
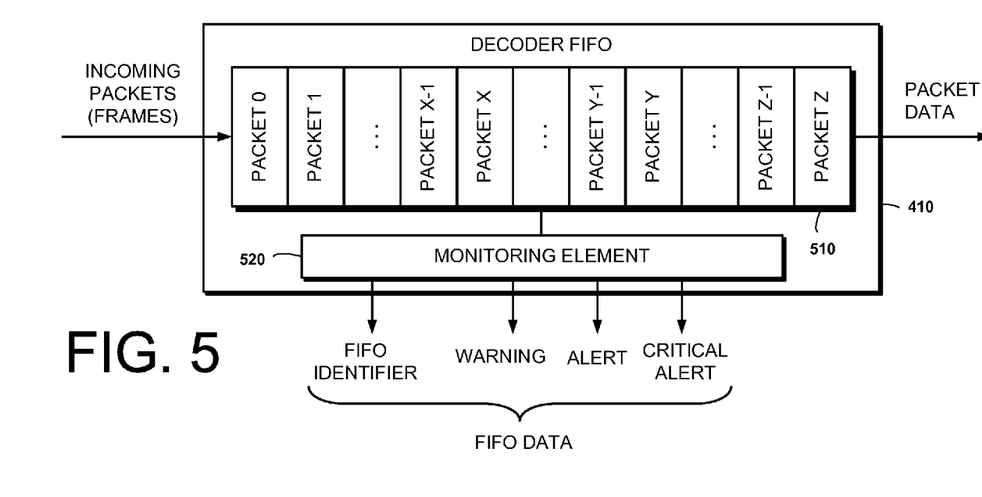
FIG. 5 is a block diagram of a decoder FIFO of FIG. 4 according to disclosed embodiments.

FIG. 5 is a block diagram of a decoder FIFO of FIG. 4 according to disclosed embodiments. As shown in FIG. 5, the decoder FIFO 410 includes a plurality of register elements 510 and a monitoring element 520.

The register elements 510 may each contain one packet of incoming data. The decoder FIFO 410 includes a set number of register elements 510 (i.e., Z elements in the disclosed embodiment). The decoder FIFO is a first in-first out buffer, meaning that packets are output in the order in which they are input.

The monitoring element 520 monitors the status of the register elements 510 determine how many of them are filled with packet data for processing. It provides FIFO data that includes a FIFO identifier identifying the decoder FIFO/channel, a warning signal that indicates when X register elements 510 are filled with packet data, an alert signal that indicates when Y register elements 510 are filled with packet data, and a critical alert signal that indicates when Z register elements 510 are filled with packet data (where Z>Y>X).

In the disclosed embodiments Z is equal to the total number of register elements 510 in the decoder FIFO 410. However, in alternate embodiments Z could be less than the total number of register elements 510. In such embodiments, the critical alert signal will become active before the decoder FIFO 410 was completely filled. In addition, while in the disclosed embodiment three signals are provided indicating whether the register has filled to three different thresholds, more or fewer signals could be used identifying whether the number of registers in the decoder FIFO 410 has passed a different number of thresholds.

Figure 6:
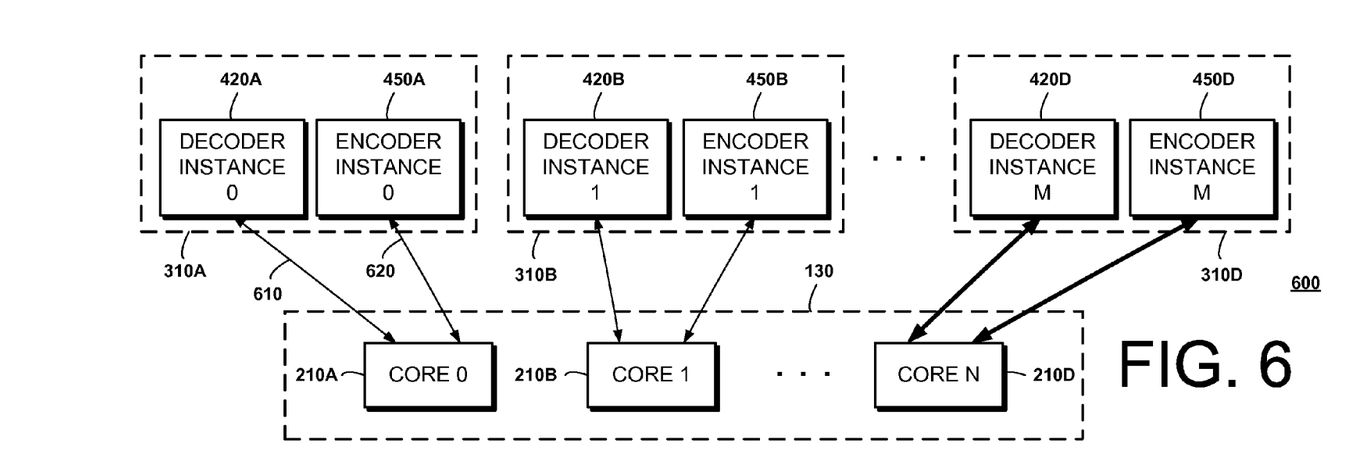
FIG. 6 is a block diagram showing a default resource allocation according to disclosed embodiments.
Figure 7:
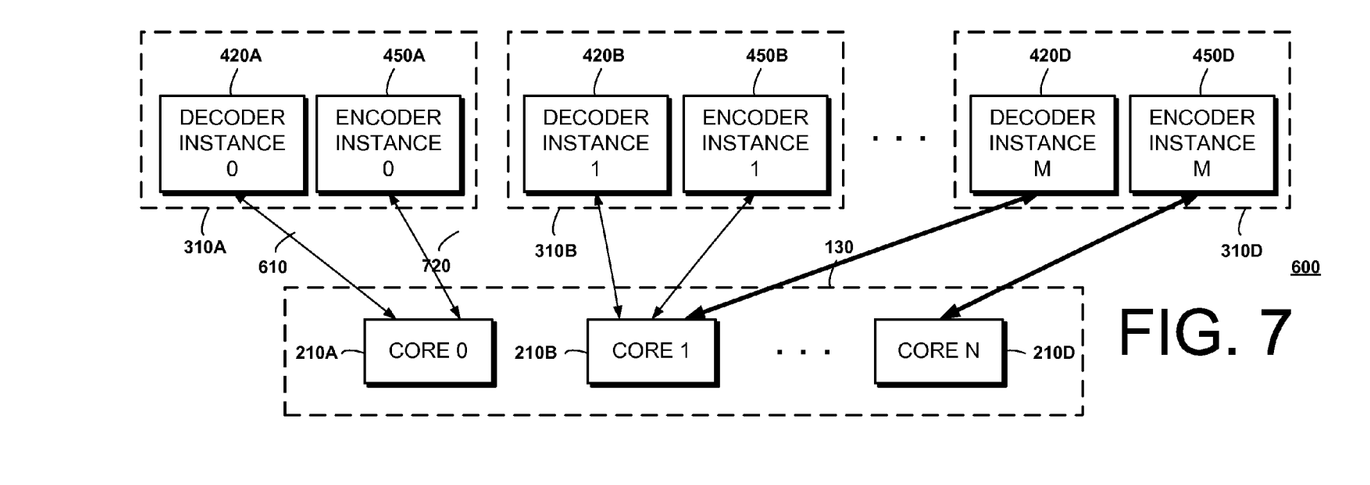
FIG. 7 is a block diagram showing a revised resource allocation according to disclosed embodiments.

FIG. 6 is a block diagram showing a default resource allocation according to disclosed embodiments; and FIG. 7 is a block diagram showing a revised resource allocation according to disclosed embodiments.

As shown by way of example in FIGS. 6 and 7, a transcoder 600 includes M channel instances 310A, 310B, . . . , 310D and N cores 210A, 210B, . . . , 210D. Channel instance 0 310A includes decoder instance 0 420A and encoder instance 0 450A; channel instance 1 310B includes decoder instance 1 420B and encoder instance 1 450B; and channel instance M 310D includes decoder instance M 420D and encoder instance M 450D.

In a default resource allocation for the transcoder 600 (See FIG. 6), decoder instance 0 420A and encoder instance 0 450A are both assigned to core 0 210A, decoder instance 1 420B and encoder instance 1 450B are both assigned to core 1; and decoder instance M 420D and encoder instance M 450D are both assigned to core N 210D. Thus, in a default position each core 210 handles the decoding/coding four a given channel instance 310.

FIG. 7 shows a revised resource allocation when the Mth channel instance 310D becomes too congested after the receipt of a new packet, but the first channel instance 310B is not congested. In this case, the decoder instance M 420D is reassigned from core N 210D to core 1 210B, while the encoder instance 450D remains associated with core N 210D.

This assignment will remain until the channel instance M receives a new packet, at which time the controller 220 in the data processing element 130 will again assess how elements within each channel instance 410 should be assigned. In this way, the resources in the data processing element 130 of the transcoder 100, 200 can be dynamically assigned based on a determination of current channel congestion.

Method of Transcoder Optimization

Figure 8:
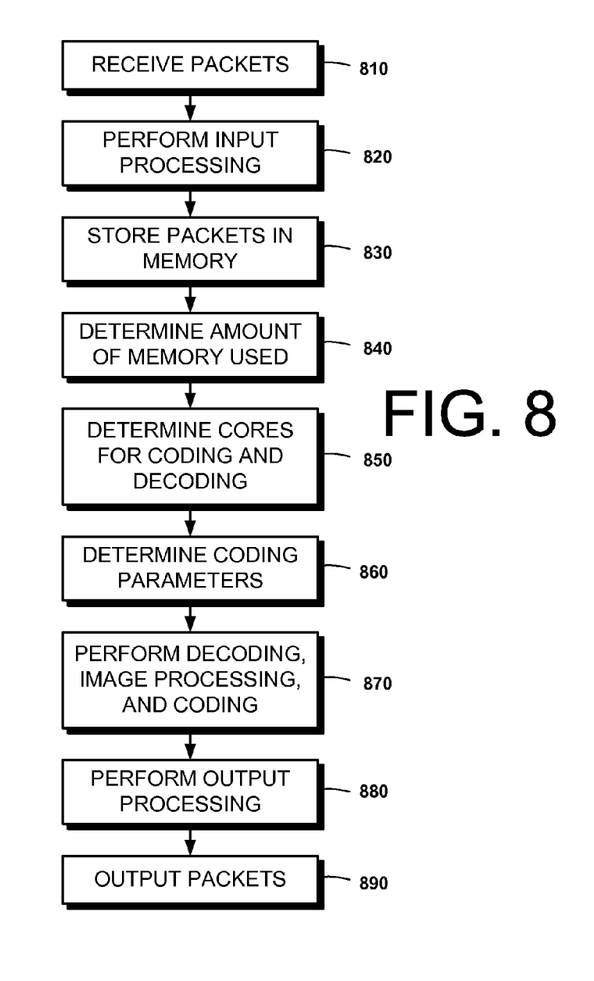
FIG. 8 is a flowchart illustrating a transcoding operation, including resource allocation, according to disclosed embodiments.

FIG. 8 is a flowchart illustrating a transcoding operation, including resource allocation, according to disclosed embodiments.

As shown in FIG. 8, the operation begins when the transcoder receives a stream of packets (i.e., frames). (810) In various embodiments this reception can be wired or wireless.

The transcoder then performs some input processing of received packets. (820) this can include packet extraction, filtering, amplification, or the like. In some alternate embodiments however, this input processing may be eliminated.

Once it has received and processed the incoming packets, the transcoder stores the incoming packets in the shared memory. (830) In the disclosed embodiments, the shared memory includes a plurality of decoder FIFO buffers that store the incoming packets.

The transcoder then determines the amount of memory used to store the incoming packets. (840) This operation is performed separately for each channel in order to estimate a level of congestion for each corresponding channel. In various disclosed embodiments this can include providing an indication of multiple levels of congestion. For example, the shared memory could indicate that a portion of the shared memory dedicated to a given channel has no congestion (i.e., it stores a number of packets below a first threshold), has little congestion (i.e., it stores a number of packets between the first threshold and a second threshold), has a moderate amount of congestion (i.e., it stores a number of packets between the second threshold and a third threshold), or has a large amount of congestion (i.e., it stores the number of packets between the third threshold and a fourth threshold). However, alternate embodiments can use more or fewer range categories. In some embodiments an indication of the highest congestion can represent a full buffer; in others it can represent a buffer nearing a full state.

Once the transcoder has determined the amount of memory used, it proceeds to determine which cores will be assigned for coding and which cores will be assigned for decoding. (850) In disclosed embodiments a default position is that the same core will be used for both decoding and coding in the same channel. Only when the channel becomes congested will the coding and decoding operations be split among separate cores. For example, if the determination of the amount of memory used above indicates no congestion in the channel, the same core will be used for decoding and coding. If however, a higher level of congestion is determined for a channel, and a channel exists with a lower level of congestion, the transcoder may distribute coding and decoding operations among the available cores in a more even manner.

In general, the transfer of coding and decoding from core to core will only be done on a packet by packet basis. Even though packets will typically be broken up into smaller components for processing by the cores, it will generally be more efficient to have a single core process all of the components that make up a given packet.

Once the transcoder has determined which cores will perform the decoding and coding operations, it proceeds to determine what the image processing and coding parameters will be for the encoding operations in the various channels based on the determination of the amount of memory used. (860) If there is a very high level of congestion (i.e., a channel memory in the shared memory is storing a larger number of packets), this can indicate that all of the channels are increased in congestion. As a result it may be necessary to alter either the image processing or encoding parameters to be less intensive in their use of core resources (e.g., MIPS). This can be achieved by either reducing the amount of image processing performed between decoding and encoding in the transcoder, or by dropping packets during the encoding process.

In the disclosed embodiments, when the use of the decoder memory reaches a moderate threshold, above the low threshold, and amount of image processing is reduced to limit the transcoding processes need for core resources. And when the use of the decoder memory reaches a high threshold, the transcoder begins to drop packets during encoding.

The disclosed transcoder does not drop packets for decoding, since decoding often relies on information from a previous packet to assist in decoding a current packet. However in any embodiments in which dropping packets for decoding would not be detrimental to the decoding process, it would be possible to drop decoding packets as well.

Then, once the cores have been assigned and all of the parameters for encoding and decoding have been determined, the transcoder performs decoding, image processing, and encoding in accordance with those parameters. (870)

Finally, the transcoder performs any necessary output processing on the packets generated during this transcoding process (880), and outputs the packets (890).

Figure 9:
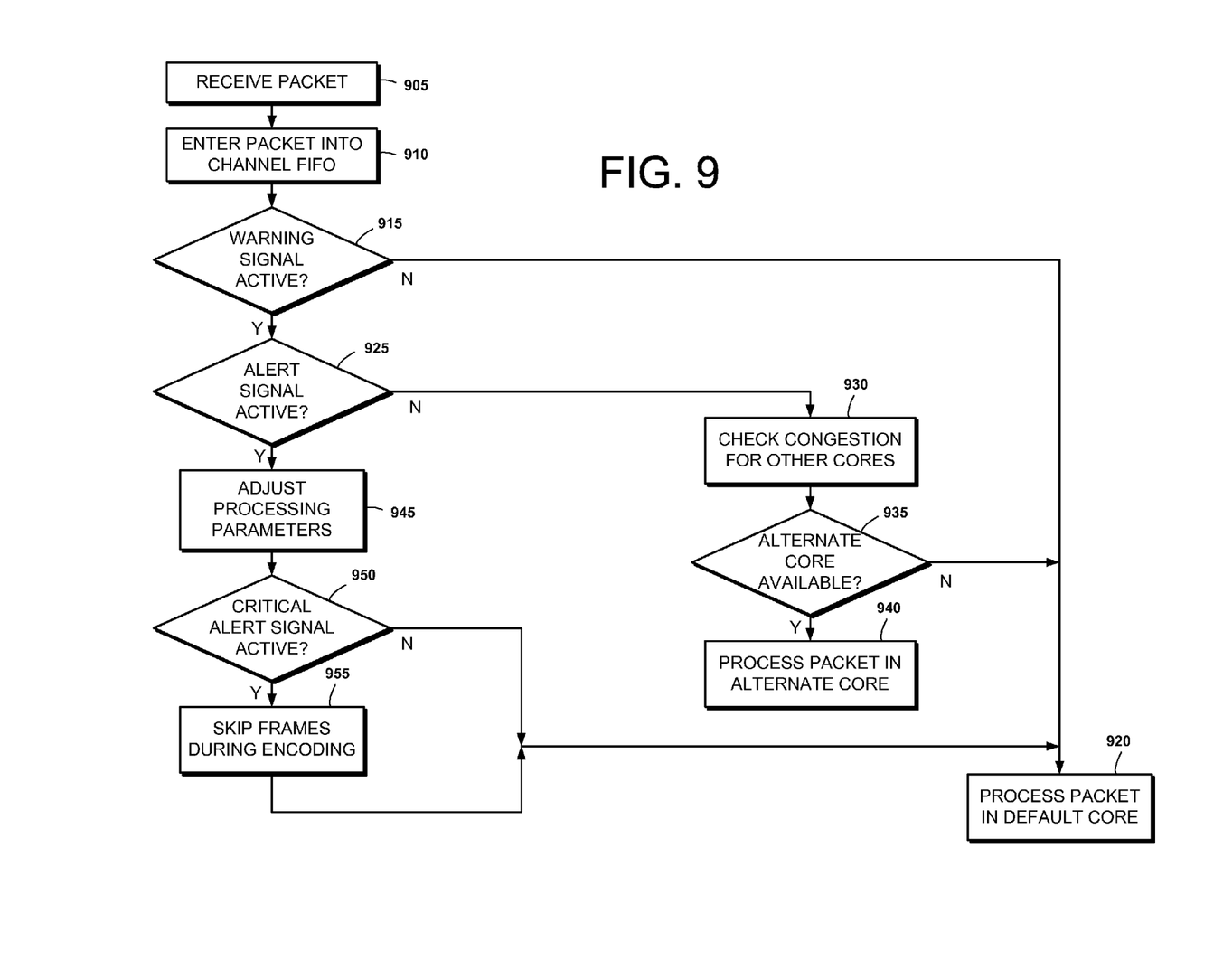
FIG. 9 is a flowchart illustrating an operation of transcoding resource allocation for a single channel according to disclosed embodiments.

FIG. 9 is a flowchart illustrating an operation of transcoding resource allocation for a single channel according to disclosed embodiments. As shown in FIG. 9, processing begins when the transcoder receives a packet of data. (905) As noted above, this process will be performed for each individual channel.

Once received, the packet data will be stored into a channel FIFO. (910) A separate channel FIFO will be associated with each channel. This FIFO will be associated with decoding operation, and can also be called the decoder FIFO.

The transcoder will then determine whether a warning signal is active with respect to the channel FIFO. (915) In the disclosed embodiments the warning signal is active when the number of packets stored in the channel FIFO rises to a first threshold value.

If the warning signal is not active, then the channel is not considered congested and the transcoder processes the packet in a default core using default image processing and coding parameters. (920) In this case, the load on the assigned core is considered to be low enough to allow full processing.

If however the warning signal is active, then the channel FIFO contains at least a number of packets equal to the first threshold value. The transcoder must then determine whether the alert signal is active. (925) In the disclosed embodiments the alert signal is active when the number of packets stored in the channel FIFO is between the first threshold value and a second threshold value (where the second threshold value is greater than the first threshold value).

If the alert signal is not active, then the channel is considered lightly congested. The transcoder then checks congestion for the other available cores. (930) This check is made to determine whether any other core has a low enough level of congestion to take on the decoding for the channel. In some embodiments a core may be considered available if it has a low level of congestion (i.e., it does not have a warning signal active). Alternate embodiments can set different criteria, however.

Based on this congestion information, the transcoder determines whether an alternate core is available for processing. (935)

If there is an alternate core available, the packet will be processed in the alternate core. (940) If, however there is no alternate core available (i.e., all other cores have levels of congestion too high to allow packets to be rerouted to them), the packet will be processed in the default core. But the core must determine what level of processing it should apply.

If the alert signal is active, then the channel FIFO contains at least a number of packets equal to the second threshold value. The transcoder will then adjust processing parameters to reduce the load on the core processing load (945). This adjustment of processing parameters can include revising or eliminating de-blocking, quarter PEL interpolation, 8×8 MV, Intra 4×4 or the like.

The transcoder must then determine whether the critical alert signal is active. (950) If the disclosed embodiments the critical alert signal is not active then the channel is considered moderately congested. In this case, the number of packets stored in the channel FIFO is between the second threshold value and a third threshold value (where the third threshold value is greater than the second threshold value). In such a case the adjustment of processing parameters should be sufficient to reduce the load on the cores, and the packet will be processed in a default core using the adjusted processing parameters.

If, however, the critical alert signal is active, then the channel is considered highly congested. In this case the number of packets stored in the channel is at least at the third threshold. At this point the adjustment of processing parameters is not sufficient to reduce the load on the cores. Therefore, the transcoder will begin skipping frames during an encoding process (955), and the packet will be processed in the default core (920).

This process will be repeated for each packet received in a given channel, and will be repeated for each channel. As noted above, although the cores may break packets up into smaller pieces to process them the determination of how to dynamically allocate resources in the transcoder will be performed at the packet boundaries of the incoming packets.

In this way, the processing resources in the transcoder (e.g., the processing ability of the transcoder's cores) can be dynamically allocated based on an estimate of the congestion of each channel in the transcoder. The allocation process can begin by spreading out processing from busier cores to less busy cores. If that isn't sufficient, the amount of image processing can be reduced to lessen the load on the cores. Finally, if even that is not enough, packets can be dropped at the encoding and the transcoder to further lessen the load of the cores. This allows the transcoder to more efficiently use its processing resources. And it allows that even in cases where there is temporary high demand for processing resources, the transcoder will maintain an acceptable quality of service on all channels.

Conclusion

This disclosure is intended to explain how to fashion and use embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An adaptive transcoder, comprising:
a shared memory containing a plurality of decoder buffers configured to store a plurality of incoming data packets, a plurality of decoder instances configured to control a decoding process to generate a plurality of image raw data based on the plurality of incoming data packets, and a plurality of encoder instances configured to control an encoding process to generate a plurality of outgoing packets based on the image raw data; and
a data processing element containing a plurality of processing cores and a core controller;
wherein each of the plurality of decoder instances is paired with one of the plurality of encoder instances,
wherein each of the decoder buffers is associated with one of the decoder instances,
wherein each respective decoder buffer includes a respective monitoring element for monitoring a status of each the respective decoder buffer, and providing buffer data corresponding to the status of the respective decoder buffer, the buffer data comprises:
a warning indicator indicating whether the respective decoder buffer has reached a first threshold of stored packets;
an alert indicator indicating whether the respective decoder buffer has reached a second threshold of stored packets, the second threshold being greater than the first threshold; and
a critical alert indicator indicating whether the respective decoder buffer has reached a third threshold of stored packets, the third threshold being greater than the second threshold;
wherein each of the plurality of the encoder instances are associated with a corresponding one of the plurality of processing cores, and
wherein the core controller uses the buffer data to associate each of the plurality of decoder instances with a selected one of the plurality of processing cores.

2. The adaptive transcoder of claim 1, wherein the core controller is configured to temporarily re-assign the respective decoder buffer and the respective associated decoder instance to a different processing core when the warning indicator indicates that the respective decoder buffer has reached the first threshold of stored packets, but the alert indicator indicates that the respective decoder buffer has not reached the second threshold of stored packets.

3. The adaptive transcoder of claim 1, wherein the encoder instance is configured to control the encoding process to drop packets during encoding when the critical alert indicator indicates that the respective decoder buffer has reached the third threshold of stored packets.

4. The adaptive transcoder of claim 1,
wherein the shared memory further comprises a plurality of image processor instances configured to perform image processing operations on the image raw data after the decoding process and before the encoding process or,
wherein each of the plurality of image processor instances is paired with one of the plurality of encoder instances, and
wherein each of the image processor instances is associated with the same processing core as the paired encoder instance.

5. The adaptive transcoder of claim 1, wherein the image processor instance is configured to reduce the amount of image processing performed during the image processing operations when the alert indicator indicates that the respective decoder buffer has reached the second threshold of stored packets.

6. A method of adaptively controlling decoding and encoding in a transcoder, comprising:
receiving incoming data packets;
storing the incoming data packets in a memory element;
determining an amount of the memory element currently being used to store the incoming data packets;
allocating processing resources for encoding and decoding based on the amount of the memory element currently being used;
performing a decoding operation on the incoming data packets to generate image raw data;
performing image processing on the image raw data;
adjusting a level of image processing performed based on the amount of the memory element currently being used and
performing an encoding operation on the image raw data to generate outgoing packets.

7. The method of adaptively controlling decoding and encoding in a transcoder, of claim 6, further comprising adjusting encoding parameters of the encoding operation based on the amount of the memory element currently being used.

8. The method of adaptively controlling decoding and encoding in a transcoder, of claim 6, wherein the determining of the amount of the memory element used further comprises:
determining whether the memory element contains at least a first threshold of stored packets;
determining whether the memory element contains at least a second threshold of stored packets, the second threshold being greater than the first threshold; and
determining whether the memory element contains at least a third threshold of stored packets, the third threshold being greater than the second threshold.

9. The method of adaptively controlling decoding and encoding in a transcoder, of claim 8, wherein the operation of allocating processing resources further comprises temporarily re-assigning performance of the decoding operation to a different processing resource when it is determined that the memory element contains at least the first threshold of stored packets but does not contain at least the second threshold of stored packets.

10. The method of adaptively controlling decoding and encoding in a transcoder, of claim 8, further comprising dropping packets during the encoding process when it is determined that the memory element contains at least the third threshold of stored packets.

11. The method of adaptively controlling decoding and encoding in a transcoder, of claim 8, further comprising performing image processing on the image raw data after the image raw data after the performing of the decoding operation, and before the performing of the coding operation, and wherein a level of image processing is reduced when it is determined that the memory element aims at least the second threshold of data packets.

* * * * *